Aug. 7, 1928.

C. G. MUNTERS

REFRIGERATION

Filed May 7, 1926

1,679,439

INVENTOR,
Carl Georg Munters
BY
his ATTORNEY

Patented Aug. 7, 1928.

1,679,439

UNITED STATES PATENT OFFICE.

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE.

REFRIGERATION.

Application filed May 7, 1926, Serial No. 107,376, and in Germany March 9, 1926.

My invention relates to refrigerating apparatus of the absorption type and more particularly to refrigerating apparatus having a constant total or gage pressure throughout, in which refrigeration is obtained by evaporation due to diffusion of a cooling agent into another substance.

The invention has for objects, amongst others, to provide an improved circulation between the absorber and generator in refrigerating apparatus of the absorption type; to provide a continuously and evenly operating circulating arrangement with highly efficient circulation; and to obtain an improved thermodynamic efficiency of the complete refrigerating process.

A characteristic feature of the invention is the introduction of an auxiliary fluid into the path of flow of the absorption liquid in local circulation between the absorber and the generator, which fluid volatilizes at a temperature which is lower than the temperature at which the cooling agent is expelled from the absorption liquid. This auxiliary fluid is caused to flow in a circulatory path which is preferably local as respects complete refrigerating organization.

Figure 1:
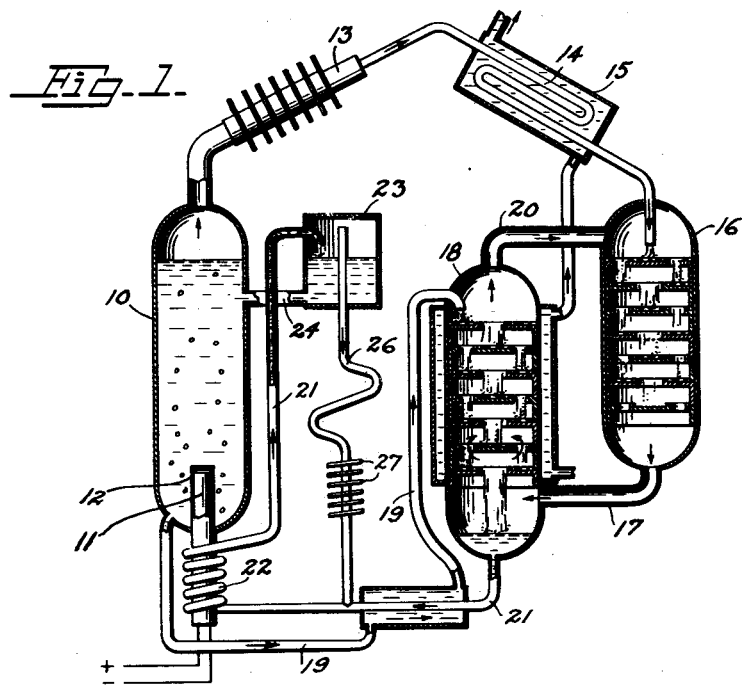
Figure 2:
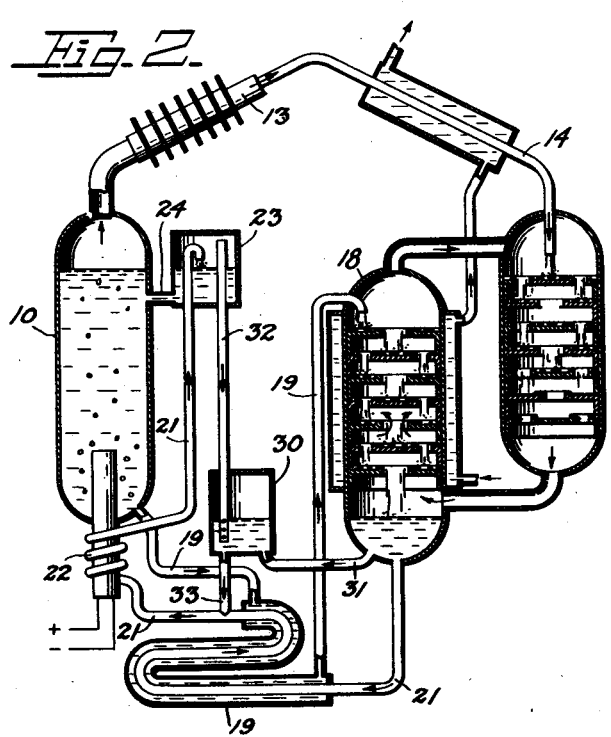
Figure 3:
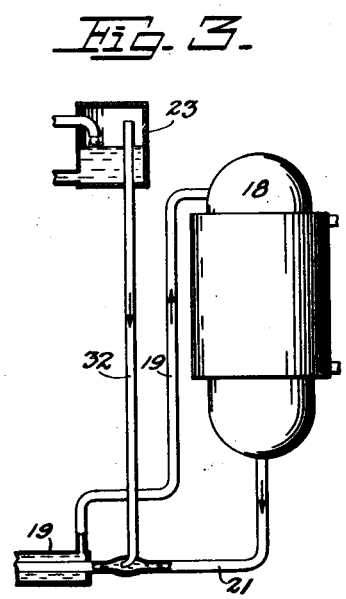

The invention will be readily understood by reference to the accompanying drawing in which: Fig. 1 shows one embodiment of the invention applied to a type of refrigerating apparatus wherein an inert equalizing gas is used and wherein the auxiliary fluid is caused to condense; Fig. 2 shows an arrangement wherein the auxiliary gas is absorbed in the absorption liquid for the cooling agent; and Fig. 3 shows a modified form of the apparatus of Fig. 2.

Referring more particularly to Fig. 1, reference character 10 designates a generator which contains absorption liquid and wherein the cooling agent, for example, ammonia, is abstracted by heat from solution in the absorption liquid, which may be, for example, water, the supply of heat consisting, in the embodiment shown, of an electric element 11 which is arranged within a pocket 12 set into the metal shell of the generator.

Vapor generated in generator 10 passes through conduit 13 and into condenser 14 which comprises a conduit in which the vapor is condensed by means of a cooling fluid such as water circulating through cooling jacket 15 surrounding the same. From condenser 14 the cooling agent in the form of liquid passes into the evaporator 16 where it mixes with an auxiliary agent, which may be, for example, hydrogen, into which it diffuses and, as a result, evaporates, thus producing refrigeration. Ammonia gas and hydrogen then pass downwardly through the evaporator as a mixture and through conduit 17 into the lower part of absorber 18. In the absorber the ammonia gas is separated from the hydrogen and passes into solution in absorption liquid supplied to the absorber from the generator by way of conduit 19. The hydrogen thus freed passes upwardly in the absorber and through conduit 20 back into the evaporator to again mix with ammonia coming from the condenser.

The present invention is not specifically directed to the general arrangement thus far described, and this arrangement is herein set out for the purpose of illustration. For a further and more detailed description of the operation of the parts hereinbefore described, reference may be had to application Serial No. 596,646 filed October 24, 1922, by Baltzar Carl von Platen and myself which has resulted in Patent No. 1,609,334 granted December 7, 1926. The arrangement thus far described and as set out in the application is not the only arrangement applicable to use with the present invention as will be understood upon further description.

Strong absorption liquid passes through conduit 21 from the lower part of the absorber to the upper part of generator 10. Conduit 21 is in part composed of a coil 22 which surrounds pocket 12 and electric heating element 11 and which is intensely heated by element 11. This conduit is connected with a vessel 23 which may be termed a gas separation vessel. Vessel 23 is situated so that a liquid level may be maintained in the same at the same height as the liquid level in the generator. Conduit 21 opens into the upper part of vessel 23. The lower part of vessel 23 is connected to the generator by means of conduit 24. A conduit 26 is connected to the upper part of vessel 23 and is also connected to conduit 21 at a point between the absorber and coil 22. This conduit 26 is in part formed as a condenser, this condenser being shown as cooled by air through the intermediary of cooling fins 27. Thus there is formed a circulating system including conduit 26, parts of conduit 21, coil 22 and the upper part of gas separation vessel 23. This circulating system contains a fluid, the circulation of which is confined to this system and is therefore local in nature. This local circulating system contains a generator, consisting of coil 22, in which this auxiliary fluid is vaporized; a separator, consisting of gas separation vessel 23 in which this auxiliary fluid in gaseous form is separated from absorption liquid saturated with cooling agent; and a condenser in which the auxiliary fluid is liquefied and from which it passes back to its generator. With the other cooperating media above designated, the auxiliary fluid may consist of butane.

In operation:

Strong absorption liquid, rich in ammonia, passes from the absorber into conduit 21 and is mixed with the auxiliary fluid in the form of liquid passing into conduit 21 from conduit 26. Thus there is a simultaneous introduction of three (or possibly more) substances into coil 22. The auxiliary fluid being more readily volatilized than the ammonia solution, bubbles of vapor of the auxiliary fluid are formed in coil 22, which bubbles serve to decrease the head of liquid in the up-leg of conduit 21 and there results a lifting of fluid from absorber 18 to gas separation vessel 23. In this operation the ammonia is not expelled from solution or is expelled to but a small degree. In vessel 23 the auxiliary fluid separates from the ammonia solution due to gravity. The strong liquor flows through conduit 24 into generator 10 in which the cooling agent is expelled from the absorption liquid while the auxiliary fluid passes in gaseous form down through conduit 26, in the lower part of which it is condensed.

The auxiliary fluid may be of nature entirely independent of the cooling agent, though this is not necessary.

In the arrangement shown in Fig. 2 a local auxiliary circulation is used wherein absorption takes the place of the condensation occurring in the lower part of conduit 26 of Fig. 1. Reference character 30 designates an auxiliary absorber which is connected to absorber 18 by means of conduit 31. Conduit 32 here takes the place of conduit 26 and opens into the lower part of auxiliary absorber 30. Auxiliary absorber 30 is connected to conduit 21 by means of a conduit 33. Except for these parts the arrangement shown in Fig. 2 is the same as that of Fig. 1.

In the operation of this modification, the auxiliary fluid is expelled from solution in coil 22 and serves to lift cooling agent solution into vessel 23. The auxiliary fluid should be so chosen that it is expelled from the absorption liquid at a lower temperature than that at which the cooling agent is expelled. There is thus a separation of one substance from the absorption liquid in coil 22 and a later separation of a second substance from the absorption liquid in the generator proper at a higher degree of temperature. The process is therefore akin to distillation. In vessel 23 the auxiliary fluid is separated and passes through conduit 32 into auxiliary absorber 30 where it is absorbed by the absorption liquid entering thereinto from conduit 31.

As fluids adaptable for use with the arrangement shown in Fig. 2, the cooling agent may consist of methylamine; the auxiliary pressure equalizing gas may be hydrogen; the absorption liquid may be water and the auxiliary fluid in the local circulation circuit between the generator and absorber may consist of ammonia. In this case the operation will not be as distinct as might be assumed from the above description which has been designed for sake of clearness. Some methylamine will be entrained with the ammonia in the local circulation and some of the ammonia will be entrained with the methylamine in the main circuit of circulation. This however does not alter the principle and, nevertheless, an effective process of refrigeration will be obtained.

In the arrangement shown in Fig. 3, the auxiliary absorber is omitted and conduit 32 is directly connected with conduit 21 at a point between absorber 18 and coil 22, preferably before conduit 21, after leaving the absorber, enters into heat exchange relation with conduit 19.

It will be readily apparent that the condensing or liquefying portion of conduit 26 of Fig. 1 and the auxiliary absorber 30 have a common function, namely, to treat the auxiliary fluid after its vaporization to adapt it to subsequent vaporization again. In either case the auxiliary fluid is expanded by heat in coil 22 and must, therefore, be contracted to adapt it to re-expansion. In each case the auxiliary fluid is treated to confine a given number of its molecules to a smaller space before vaporization. In other words, the auxiliary fluid is densified or shrunk in condenser 27 of Fig. 1 and in auxiliary absorber 30 of Fig. 2. It will be apparent that this common terminology also applies to the arrangement of Fig. 3.

It will be obvious that various departures may be made from the arrangements herein shown and that other apparati may be built which fall within the terms of the invention. As one obvious change, I desire to point out that the condenser for the auxiliary fluid in the apparatus of Fig. 1 may be liquid cooled instead of air cooled. This would be preferable in using some fluids such as propane.

It will further be obvious from the above description that an arrangement can be made wherein the introduction of the auxiliary fluid takes place into the conduit carrying absorption liquid from the generator to the absorber. Such an arrangement may be used in combination with the modifications above described wherein the auxiliary fluid is introduced into the conduit extending from the absorber to the generator. This may involve a rearrangement of the generator and absorber, which matter will be apparent to one skilled in the art.

What I claim is:

1. Refrigerating apparatus comprising a generator, an absorber, a condenser, an evaporator, a conduit for conducting absorption liquid from said absorber to said generator, heating means for said conduit, means to introduce an auxiliary fluid into said conduit between said absorber and said heating means and means to remove gas from the absorption liquid at a place in said conduit between said heating means and said generator.

2. Refrigerating apparatus comprising a generator, an absorber, a condenser, an evaporator, a conduit for conducting absorption liquid from said absorber to said generator, heating means for said conduit and means to withdraw fluid from said conduit between said heating means and said generator and to re-introduce the fluid withdrawn into the conduit between the absorber and the heating means.

3. Refrigerating apparatus comprising a main generator for expelling a cooling agent from solution in an absorption liquid therein, a condenser for condensing the cooling agent, an evaporator for evaporating the cooling agent, a main absorber for absorbing the cooling agent, an auxiliary generator, an auxiliary absorber, a gas separation vessel, and connections between the afore-mentioned elements to afford a major cycle of circulation for the cooling agent through and between the main generator, the condenser, the evaporator and the main absorber, to afford a local cycle of circulation between and through the main absorber and the evaporator for a pressure equalizing medium contained therein, to afford a local cycle of circulation between and through the auxiliary generator, the main generator, the gas separation vessel and the main absorber for absorption liquid, and to afford a local cycle of circulation between and through the auxiliary generator, the gas separation vessel and the auxiliary absorber for an auxiliary fluid contained therein adapted to be expelled in gaseous form from solution in the absorption liquid at a lower degree of temperature than the cooling agent.

4. Refrigerating apparatus comprising a main generator, an absorber, a condenser, an evaporator, an upwardly extending conduit for absorption liquid connected to said generator and connected to said absorber, an auxiliary generator interposed in said conduit, means to introduce an auxiliary fluid into said conduit below said auxiliary generator and means to remove gas from said conduit above said auxiliary generator.

5. Refrigerating apparatus comprising a main generator, an absorber, a condenser, an evaporator, an upwardly extending conduit for absorption liquid connected to said generator and connected to said absorber, an auxiliary generator interposed in said conduit and means to withdraw fluid from said conduit at a higher level than said auxiliary generator and to reintroduce the fluid withdrawn into the conduit at a lower level than said auxiliary generator.

6. Refrigerating apparatus comprising a main generator for expelling a cooling agent from solution in an absorption liquid therein, a condenser for condensing the cooling agent, an evaporator for evaporating the cooling agent, an absorber for absorbing the cooling agent, an auxiliary generator, a gas separation vessel, and connections between the afore-mentioned elements to afford a major cycle of circulation for the cooling agent through and between the main generator, the condenser, the evaporator and the absorber, to afford a local cycle of circulation between and through the absorber and the evaporator for a pressure equalizing medium contained therein, to afford a local cycle of circulation between and through the auxiliary generator, the main generator, the gas separation vessel and the absorber for absorption liquid and to afford a local cycle of circulation between and through the auxiliary generator and the gas separation vessel for an auxiliary fluid contained therein adapted to be expelled in gaseous form from solution in the absorption liquid at a lower degree of temperature than that at which the cooling agent is expelled from solution.

7. That improvement in the art of refrigerating through the agency of a generator-condenser-evaporator-absorber cycle which consists in introducing into the absorption liquid an auxiliary fluid adapted to be vaporized in the presence of the absorption liquid at a lower temperature than the cooling agent, heating the absorption liquid and added auxiliary fluid to vaporize the auxiliary fluid and thus decrease the density of the absorption liquid and added auxiliary fluid, producing circulation of the absorption liquid under the influence of the decrease in density and withdrawing the vapor of the auxiliary fluid from the absorption liquid.

8. That improvement in the art of refrigerating through the agency of a generator-condenser-evaporator-absorber cycle which consists in introducing into the absorption liquid passing from the absorber to the generator an auxiliary fluid adapted to be absorbed by the absorption liquid and to be expelled from the absorption liquid in gaseous form at a lower temperature than the cooling agent, heating the absorption liquid and vaporizing the auxiliary fluid, and separating the vapor of the auxiliary fluid from the absorption liquid before the absorption liquid passes into the generator.

9. The method of moving an absorption liquid containing volatile fluid in solution within a circuit which comprises introducing into the circuit an auxiliary fluid capable of being absorbed by the absorption liquid and capable of being expelled from the absorption liquid in gaseous form at a lower temperature than that at which the first-mentioned volatile fluid is expelled from the absorption liquid, heating the absorption liquid containing the first-mentioned fluid and the auxiliary fluid to vaporize the auxiliary fluid but not the first-mentioned fluid and thus to decrease the density of the added fluids, producing circulation under the influence of the decrease of density, separating the gaseous auxiliary fluid from the absorption liquid containing the first-mentioned volatile fluid, and reabsorbing and reintroducing the auxiliary fluid into the circuit to again be heated and transferred to gaseous form.

10. That step in refrigerating through the agency of a generator-condenser-evaporator cycle which consists in moving absorption liquid laden with a cooling agent in circuit between the generator and absorber by vaporization of an auxiliary fluid capable of volatilization in the presence of the absorption liquid at a different temperature than the cooling agent.

11. Refrigerating apparatus comprising a generator for expelling a cooling agent from solution in an absorption liquid therein, a condenser for condensing the cooling agent, an evaporator for evaporating the cooling agent, an absorber for absorbing the cooling agent, an auxiliary member for contracting a gaseous fluid to adapt it for subsequent expansion, a gas separation vessel and connections between the aforementioned elements to afford a major cycle of circulation for the cooling agent through and between the generator, the condenser, the evaporator and the absorber, to afford a local cycle of circulation between and through the absorber and the evaporator for a pressure equalizing medium contained therein, to afford a local cycle of circulation between and through the absorber, the gas separation vessel and the generator for absorption liquid, and to afford a local cycle of circulation between and through the gas separation vessel and the auxiliary member for an auxiliary fluid contained therein.

12. That improvement in the art of refrigerating through the agency of a generator-condenser-evaporator-absorber cycle having a local circuit of circulation for absorption liquid containing a cooling agent in solution between the generator and absorber which consists in introducing into the absorption liquid in the local cycle an auxiliary fluid adapted to be vaporized in the presence of the absorption liquid at a lower temperature than the temperature at which the cooling agent is vaporized by being expelled from the absorption liquid, heating the absorption liquid and auxiliary fluid to vaporize the auxiliary fluid and thus decrease the density of the added fluids within the cycle, producing circulation of the absorption liquid under the influence of the decrease in density, withdrawing the vapor of the auxiliary fluid, shrinking the auxiliary fluid to adapt it for subsequent vaporization and reintroducing the auxiliary fluid into the cycle to again become vaporized.

13. The method of moving an absorption liquid containing a volatile fluid in solution within a circuit which comprises introducing into the circuit an auxiliary fluid, said auxiliary fluid being capable of volatilization in the presence of the absorption liquid at a lower temperature than that at which the first mentioned volatile fluid is volatilized in the presence of the absorption liquid, heating the mixture of fluids thus produced to vaporize the auxiliary fluid and to decrease the density of the added fluids, producing circulation under the influence of the decrease of density, separating the volatilized auxiliary fluid from the absorption liquid containing the first mentioned fluid, treating the auxiliary fluid thus separated to adapt it to subsequent vaporization and reintroducing the auxiliary fluid into the circuit to again become vaporized.

14. The method of moving an absorption liquid containing a volatile fluid in solution within a circuit which comprises introducing into the circuit an auxiliary fluid in liquid form, said auxiliary fluid being capable of volatilization in the presence of the absorption liquid at a lower temperature than that at which the first mentioned volatile fluid is volatilized in the presence of the absorption liquid, heating the mixture of fluids thus produced to vaporize the auxiliary fluid and to decrease the density of the added fluids, producing circulation under the influence of the decrease of density, separating the volatilized auxiliary fluid from the absorption liquid containing the first mentioned volatile fluid, densifying the auxiliary fluid thus separated and reintroducing the auxiliary fluid into the circuit to again become vaporized.

In testimony whereof I hereunto affix my signature.

CARL GEORG MUNTERS.